United States Patent [19]

Stock

[11] 3,994,214

[45] Nov. 30, 1976

[54] APPARATUS FOR HEATING FOODSTUFFS OR OTHER SUBSTANCES

[76] Inventor: Hermann Stock, Wuhrenallee 6, 2350 Neumunster 2, Germany

[22] Filed: Dec. 20, 1974

[21] Appl. No.: 534,885

[52] U.S. Cl. .................................. 99/483; 99/369
[51] Int. Cl.² .................................... A23L 3/02
[58] Field of Search ............ 99/360, 361, 362, 369, 99/404, 409, 443 C, 483; 134/159; 118/426

[56] References Cited

UNITED STATES PATENTS

| | | | |
|---|---|---|---|
| 3,474,726 | 10/1969 | Curtin | 99/404 |
| 3,570,392 | 3/1971 | Hoover | 99/369 X |
| 3,614,924 | 10/1971 | Hickey | 99/404 |

Primary Examiner—Edward L. Roberts
Assistant Examiner—Alan Cantor
Attorney, Agent, or Firm—Toren, McGeady and Stanger

[57] ABSTRACT

The apparatus for heating foodstuffs or other substances disposed in cans (hereinafter also referred to as canned food) comprises a boiler and a quantity of flowable heating medium in the boiler and only partially filling the same, a heater to bring the flowable heating medium to a given temperature, a retaining means for at least one can disposed in the boiler, bearing means for the movable mounting of the retaining means in the boiler, drive means on the boiler to move the retaining means, the latter having a range of motion which is situated partially above and partially below the level of the flowable heating medium in the boiler, and also comprising an aperture in a boiler wall above the level and at a place adjacent the top range of motion of the retaining means, and comprising a closure flap for said aperture.

7 Claims, 7 Drawing Figures

APPARATUS FOR HEATING FOODSTUFFS OR OTHER SUBSTANCES

BACKGROUND OF THE INVENTION

The invention also relates to apparatus for heating foodstuffs or other substances disposed in containers (hereinafter also referred to as cans of food) comprising a heatable boiler receiving a flowable heating medium, more particularly water.

The above reference to foodstffs or other substances means that the preferred application of the invention is to foodstuffs and the other substances may, for example, be blood plasma or solutions.

Where containers are referred to, such containers are cans of food in the preferred embodiment.

For food preparation purposes, it is known to open cans of food and empty the contents into, and heat them in, a saucepan, or else place the closed can in a boiler which may or may not be of saucepan shape, such boiler being filled with water, the contents of the cans being heated by heating the water. In either case, the reheating operation is a relatively long one. This is because the can of food remains stationary in the heating medium, i.e., boiling water, while there are different temperatures over the height of the can and the heat has to penetrate inwards through the stationary contents of the can, so that there is also varying heating across the diameter of the contents of the can. This is a disadvantage in the case of a can of food which has already been subject to one heating operation, because the reheating operation frequently influences the taste of the food, depending upon the consistency and nature thereof. If a can of food is heated in water, different parts of the food are heated to different intensities and for different lengths of time.

Although the attempt has been made to obviate these disadvantages by the other method indicated above, i.e., emptying the contents into a vessel in the form of a saucepan, in which case the contents thereof can be agitated, a disadvantage in addition to the operation required is that the contents of the vessel subsequently have to be emptied into separate dishes or containers, apart from the fact that heating in a saucepan results in flavour losses due to escaping vapour.

SUMMARY OF THE INVENTION

The object of the invention is to provide an apparatus which is effective to improve the heating of foodstuffs in containers, a shorter heating time being achieved with uniform treatment of all the parts of a unit, while at the same time the original condition, more particularly of certain foods, whether meat, vegetables or fruit, is retained in respect of both taste and appearance, with a short treatment time.

To this end, according to the invention, the containers or cans of food are moved through a flowable heating medium, more particularly heated water, but with continuously successive and alternating immersion and emersion.

The advantage of this apparatus is that the movement of the containers through the flowable heating medium gives a better heat transfer than if the can of food were simply stationary in the heating medium. Since, however, the cans are continuosly and alternately immersed and removed from the water during the movement, the relative speed between the heating medium and the container walls is additionally increased, a fact which would not necessary apply if the containers were moved in a heating medium without the immersion and emersion operation, because then the relative speed between the heating medium and the container walls can decrease as a result of the entrainment of the heating medium. The immersion and emersion also gives an agitation effect in the heating medium, and in practice this avoids a temperature variation in the heating medium in dependence on its distance from a heater.

The alternate immersion and emersion processes continuously agitate the heating medium in such manner than an intensive relative movement is always maintained between the cans of food and the heating medium because the latter cannot adjust to the movement of the containers even with a relatively long period of operation.

The relative movement of the heating medium at the container wall is improved by the fact that the respective strata of heating medium flow away when the tin of food is lifted out of the medium, the immersion and emersion of the containers providing a temperature uniformity throughout the boiler, and greater heat penetration is obtained by the now actually occurring relative movement between the heating medium and the container wall whereby the heating medium is reliably continually replaced at the container wall.

When cylindrical tins or cans are used, the containers are preferably turned over and over during the movement. This movement of the containers is advantageous because the contents of the containers are rotated at the same time and different parts of the contents of the container alternately reach the container wall.

More particularly, the invention provides apparatus wherein the boiler contains a retaining means for at least one can of food, said retaining means being mounted movably and being so connected to a drive that at least the said one can of food is continuously successively immersed into and then lifted out of the heating medium.

A control means is also provided to monitor the level to which the boiler is filled, in order to control the inflow of heating liquid, more particularly water, said control means limiting the filling of the boiler to a partial volume thereof.

Although the said movement of the container may be provided by upwardly and downwardly moving means, possibly in the form of a reciprocating movement or conveyor-like means in a particularly preferred embodiment of the invention, the retaining means is a carrier mounted rotatably and its axis of rotation or shaft is situated substantially in or beneath the plane defined by the level of heating medium, more particularly water, bur a top section of said carrier is situated above said plane. An embodiment of this kind permits immersion and emersion and the turning-over movement of the containers with simple means.

The alternate immersion and emersion also does away with the need for the heating medium surrounding the can of food, more particularly water, to be boiled up, i.e. vigorously.

It should be noted that the invention operates preferably with water as heating medium at a temperature below 100° C To heat cans of food it is also possible to use lower temperatures. The temperature range from 40° to 70° C has proved particularly advantageous. Higher temperatures are also possible. These can be obtained by the use, for example, of salt water, glycerin, oil or the like as heating medium or by constructing the apparatus as a pressurised apparatus. The invention extends to such means as well.

Advantageously, the carrier is of discoid construction and a number of cans are releasably secured concentrically about the shaft but preferably with their axis disposed radially. Here again, the boiler may be closable in the form of a pressurized boiler and be of cylindrical construction, in which case the shaft is advantageously provided concentrically of the cylinder axis, which is disposed substantially horizontally.

According to a particularly preferred embodiment of the invention, the carrier is in the form of a basket-like framework, the periphery of which has retaining means for cans so arranged that the cans are disposed with their longitudinal axis tangentially to the circle of rotation and the top zone of the boiler has at least one closable aperture through which tins disposed in the uppermost position can be introduced or removed. The heating medium can be filled to the lower edge of the closable aperture, it being preferred particularly to have a permanent filling for a plurality of charges in order to minimise energy requirements for heating up the heating medium.

Preferably, the retaining means are provided with a clamping closure for fixing the cans of food in combination with a support disposed pivotally on the carrier, in such manner that when the clamping means is opened the said support is brought into a position sloping down towards the bottom edge of the aperture. This facilitates the entry and removal of cans of food. In another advantageous embodiment, the support which advantageously consists of rails in the axial direction of the carrier, is mounted pivotally on the end remote from the aperture and when the clamping closure is opened there is simply a lowering movement of the support.

To this end, advantageously, that end of the support which is adjacent the aperture is provided with a pivoting bowed member which belongs to the retaining and clamping system and which at a distance from its ends is mounted pivotally on the support while its end is guided movably with respect to the carrier on at least one supporting plate while the other outer end which is at a greater distance from its pivot mounting is adapted to be connected to and tension a spring bowed member engaging over the cans of food. Of course means may be provided between the inner end of the pivoting bowed member and the supporting plate in order to reduce friction, for example rollers at the end of the pivoting bowed member. Constructing the part engaging over the cans in the form of a spring bowed member means that the clamping closure simultaneously lifts away from the cans when it is opened.

Advantageously, the pivoting bowed member forms a loading or unloading path for the cans of food, said path extending over the bottom edge of the aperture. This facilitates charging the apparatus when the heating medium remains in the boiler.

In one construction of the apparatus, advantageously, a tank which may be pressure-tight is provided beneath the boiler, said tank being intended for the heating medium, more particularly water, and comprising a downwardly directed sump-like extension to which the intake of a pump is connected, said pump being connected to the lowest point of the boiler via a pipe, the boiler being provided at substantially midheight with an overflow connected to the tank via a pipe, the downwardly directed extension of the tank being provided with a heating means, more particularly a heater. The advantage of this construction in which the heating medium tank is disposed more particularly beneath the boiler is that cyclic operation is possible and a sufficiently high temperature can be attained with a device in the form of a continuous heater when cans of food are heated, the power required for this purpose then being relatively low.

Advantageously, the boiler overflow is adjustable as to height. Conditions can thus also be altered to adjust the nature of the food depending on the speed of rotation of the carriers.

According to another feature of the invention, retaining means on the carrier consist of retaining pins which extend parallel to the axis and which have hook-like bent-portions at their free end and a can of food is adapted to be introduced between an associated group of retaining pins and retaining elements engaging over the tin of food are disposed releasably at the bent portions.

Preferably in all the embodiments described, the carrier accommodates a plurality of cans of food side by side in its axial direction, and if required comprises a plurality of discs disposed successively on a tubular sleeve disposed on the shaft and connected thereto so as to rotate therewith.

BRIEF DESCRIPTION OF THE DRAWINGS

The invention is explained hereinafter with reference to an exemplified embodiment illustrated diagrammatically in the drawing wherein.

DETAILED DESCRIPTION OF THE PREFERRED EMBODIMENTS

Figure 1:
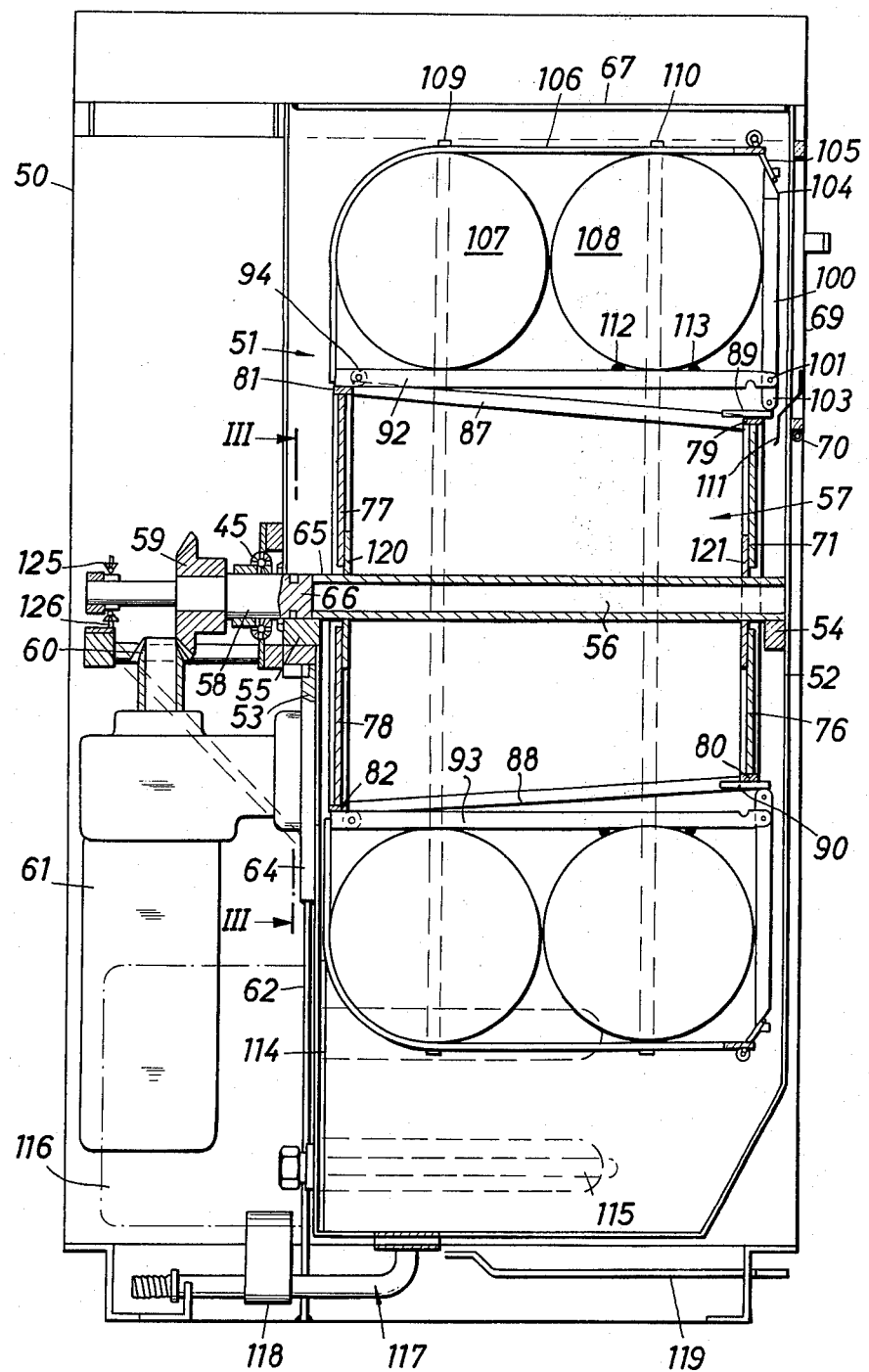
FIG. 1 is a side elevation of an advantageous embodiment according to the invention in Section.

The embodiment shown in FIGS. 1 to 3, which is the particularly preferred embodiment, will first be described.

An advantageously enclosed frame 50 contains a boiler 51, which may be deeper at the top than at the bottom and which at approximately midheight has bearings 54, 55 at the front wall 52 and rear wall 53, said bearings being in the shape of a U open at the top and being provided for the ends of a shaft 56 of a carrier 57 in the form of a basket. The end of a shaft 58 which is taken through a sealed bushing 45 extends in the region of the rear bearing 55, said shaft 58 being connected via a transmission gear 59, 60 to a geared motor 61 which, for example, is supported by special supports 62, 63 and is secured to a plate 64 disposed on the supports.

Both the end of the shaft 58 and the end 65 of the shaft 56 engaging therewith form halves of a coupling, the end 65 of the shaft 56 being formed, for example, with a diagonal slot into which a diagonal key 66 on shaft 58 can be inserted when the parts are vertically aligned.

At the top, the boiler 51 has an opening which is adapted to be closed by a lid 67 and through which the basket carrier 57 can be removed or inserted as a unit. However, this is not essential to continuous operation.

For the purpose of loading the basket carrier, the front wall 52 of the boiler is formed with an aperture 68 which is adapted to be closed by a flap-like cover 69 which is adapted to swing open at the bottom edge about pivots 70 so that when it is open it forms a supporting table at the bottom edge of the aperture 68.

As will be apparent from FIG. 2 as well, the basket carrier consists of a framework of struts which is disposed on the shaft 56 and which comprises struts 71–76 each extending radially from a disc 120, 121 secured on the shaft, said struts each terminating below a retaining means substantially in the middle. Referring to FIG. 1, the struts 71–76 disposed at the front are shorter than the struts disposed at the back wall, two of the latter struts having the references 77, 78 in FIG. 1. Rails 79, 80; 81, 82 respectively are fixed to the struts and each extends at right angles thereto, the ends of said rails being connected at an angle to rails 83, 84; 85, 86 respectively disposed on adjacent struts so that polygons are formed in actual fact, such polygons being hexagons in this example, the retaining means for cans of food or the like being secured on the outsides thereof. The hexagons, the forwardly situated one of which is smaller than the rearwardly situated one, are connected in the region of the rails 79–86 by connecting rods 87, 88 extending at an angle to the shaft 56, each two such rods being disposed in parallel relationship. Supporting plates 89, 90 are arranged correspondingly in pairs on said connecting rods towards the front as shown in the case of the supporting plates 89 and 91 in FIG. 2.

The retaining means comprises supports 92, 93 each formed for example, by two parallel rails above the supporting plates and pivotable about pivots 94, 95 at that end of a bearer which faces the back wall 53. At the front end of the rails 96, 97 forming the support 92 a bowed member or locking stirrup 100 advantageously consisting of two struts 98, 99 is so pivotable about pivots 101, 102 that a short lever arm 103 extends vertically downwards when the clamping system is closed and bears on the supporting plate 89, 91 while the top end 104 is provided with means, for example a slot, for a clamping closure element 105. The latter, in the form of an eye, is pivotable at the front end of a bowed spring member 106 which engages, for example, over two cans 107, 108 disposed on the support 92. The spring member 106 is retained with clearance beneath outer sills 109, 110 of the basket carrier so that it is not free to move outwards.

From the closed position illustrated in FIG. 1 it will be apparent that the flap cover 69 can be opened, in which case a spring abutment 111 engages beneath the supporting plates 89, 91 to maintain the substantially horizontal open position. After the closure element 105 has been released, the spring member 106 springs upwards and as the bowed member or locking stirrup 100 is opened the support 92 is simultaneously lowered towards the connecting rod 87. The front can 108 is still retained on the support 92 between projecting abutments 112, 113, but can be readily removed, so that the can 107 then automatically rolls forwards towards the aperture.

The back wall 53 of the boiler is provided with a heating flange 114 on which is disposed a heating element 115 projecting into the boiler while the outside part is provided with operating and connecting means 116 for the heating system.

Fittings 117 and connections for the supply and discharge of water are also provided, while valve means 118 can be actuated from the front, for example via a linkage 119.

It will be seen from FIG. 1 that the shaft 58 is completely enclosed on the outside of the back wall while the bearing element in the form of a U open at the top is provided at the inside.

Figure 4:
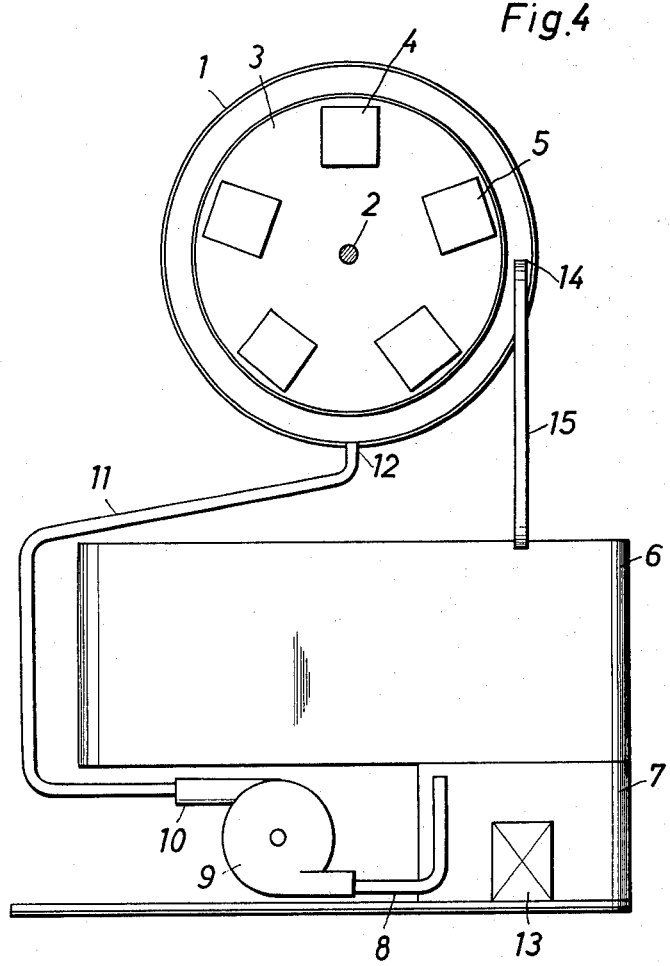
FIG. 4 is a schematic elevation of another apparatus according to the invention.

Referring to FIG. 4, which is a schematic diagram, a boiler 1 is provided which is, for example, of cylindrical construction with a horizontal axis. Passing through this boiler is a concentric shaft 2 on which at least one discoid carrier 3 for cans of food 4, 5 is mounted for rotation. The boiler is closed at one end while the other end is adapted to be closed by a pressure closure.

A container or tank 6 which, if required, may be pressure-tight, is provided more particularly beneath the boiler and has a downwardly extending extension 7 after the style of a sump connected at its lowest point to the intake connection 8 of a pump 9. The intake connection advantageously terminates near the top end of the extension 7 so that hot water collecting in the latter is withdrawn at the maximum temperature zone. The delivery connection 10 of pump 9 is connected via a pipe 11 to the lowest point 12 of the boiler 1 and the pump intake spigot is connected correspondingly.

The downwardly directed extension 7 is provided with a heater 13, more particularly a continuous flow heater and where such a heater is provided in the extension 7 the latter is constructed in the form of such a heater.

Preferably at mid-height the boiler 1 has an overflow 14, which is advantageously adjustable to a certain extent with respect to mid-height and which is connected to the tank 6 via a pipe 15.

When the pump 9 is stationary, it allows the liquid to flow particularly from the boiler 1 back to the tank. Pumps of this kind are known.

The volume of the tank 6, more particularly without the interior of the extension 7, is such as to correspond substantially to the boiler 1 being filled to the level of the overflow 14.

The heating medium is preferably water. This is initially in the tank 6. After the heating system 13 has been switched on, the water is heated and delivered by the pump 9 to the boiler 1, the carrier 3 containing the cans 4, 5 being rotated. The hot water agitated as a result rises to the level of the overflow 14 and then flows back through pipe 15 to tank 6 and more particularly to the lowermost extension 7. The latter is therefore always kept full to a level such that the heating system 13 is covered.

Figure 5:
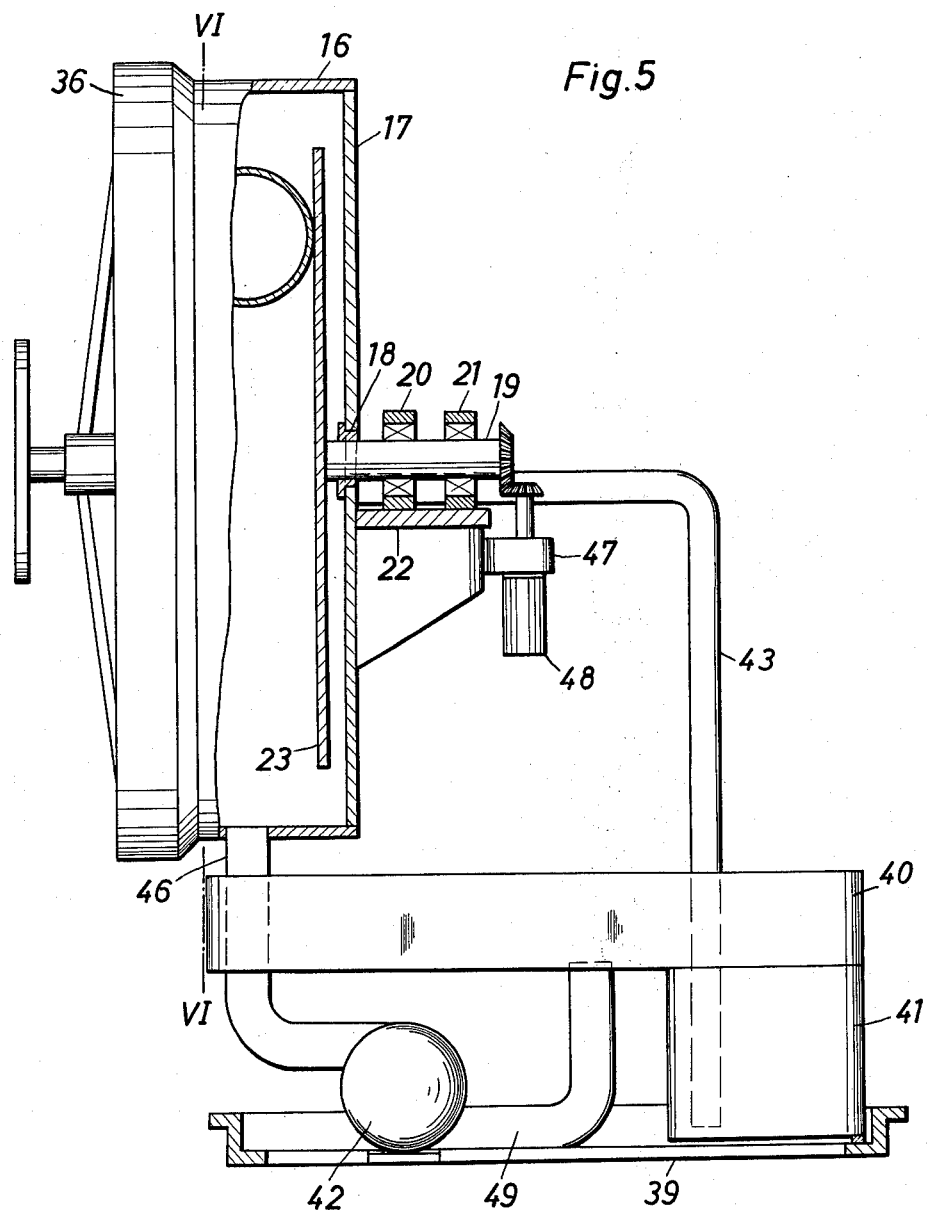
FIG. 5 is a side elevation of the apparatus in a simple embodiment in section.
Figure 6:
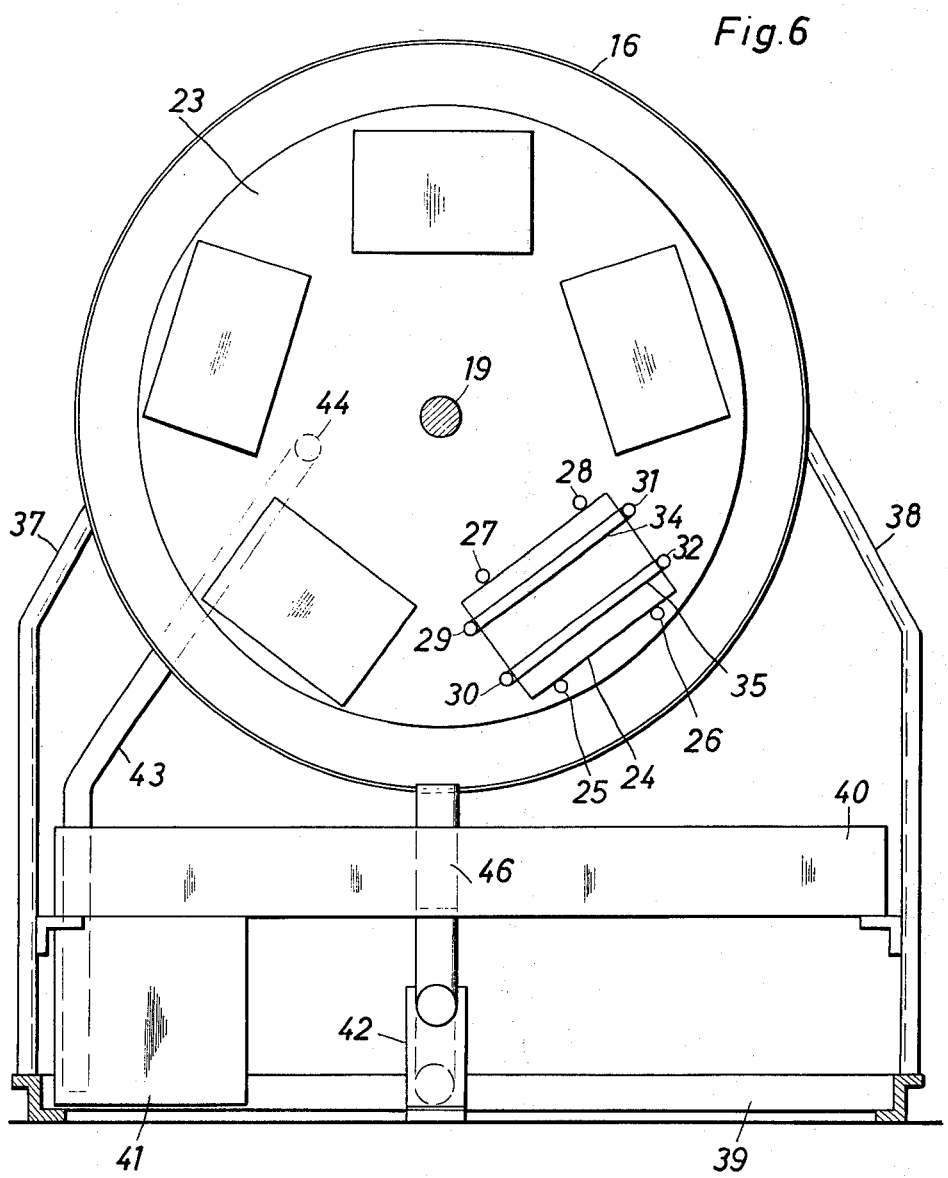
FIG. 6 is an end elevation in section on the line VI—VI in FIG. 5.

FIGS. 5 and 6 are a more detailed illustration.

The boiler 16, which is again cylindrical with horizontal axis, is externally thermally insulated and has a back wall 17 through which passes a sealed bushing 18 for a shaft 19. Bearings 20, 21 for the shaft are provided on a bracket 22 on the back wall 17. Inside the boiler the shaft bears a disc 23 which rotates therewith (see also FIG. 6, in which it is shown, for example, for the can 24).

A group of holder or retaining means 25, 26, 27, 28, 29, 30, 31, 32 is provided in the form of retaining pins between which a can of food or the like can be placed. With regard to the grouped arrangement, these retaining pins are bent outwardly at their free ends and at these points bear retaining elements 34, 35 which engage over the can. These retaining elements may, for example, consist of belts or rubber or similar material.

At the side remote from the rear wall 70, the boiler 16 is closed by a pressure closure 36 known per se.

The boiler is supported by lateral supports 37, 38 from a plinth 39 on which the water tank 40 is situated being secured to brackets. The boiler has a downwardly directed extension 41 to which the pump 42 can be connected. Referring to FIG. 5, however, the connecting pipe 49 is led to the bottom of the water tank 40 which at this point may be constructed in the form of a sump so that hot water coming from the extension 41 (which contains a heater not shown in detail in FIGS. 5 and 6) reaches the connecting pipe 49. Pipe 43 from overflow 44 leads into the extension 41. This overflow is situated at the level of the shaft 19 for example.

It will also be seen that a pipe 46 terminates at the lowest point of boiler 16. This pipe corresponds to pipe 11 in FIG. 4 and is associated with the pump correspondingly.

The pump 42 is combined with a motor. A gear 47 is provided on the bracket 22 and on it is flanged a motor 48 which provides the rotation, the control system being such that the motor 48 and the motor of the pump 42 operate simultaneously, i.e. at the start of the filling of the boiler 16, but on disconnection the motor of pump 42 is first switched off, motor 48 not being disconnected until this has taken place. It is not shown in detail but can be achieved with simple means. Relay circuits are possible, and also certain time control elements may be provided in view of mass inertia and the magnitude of the apparatus.

Figure 2:
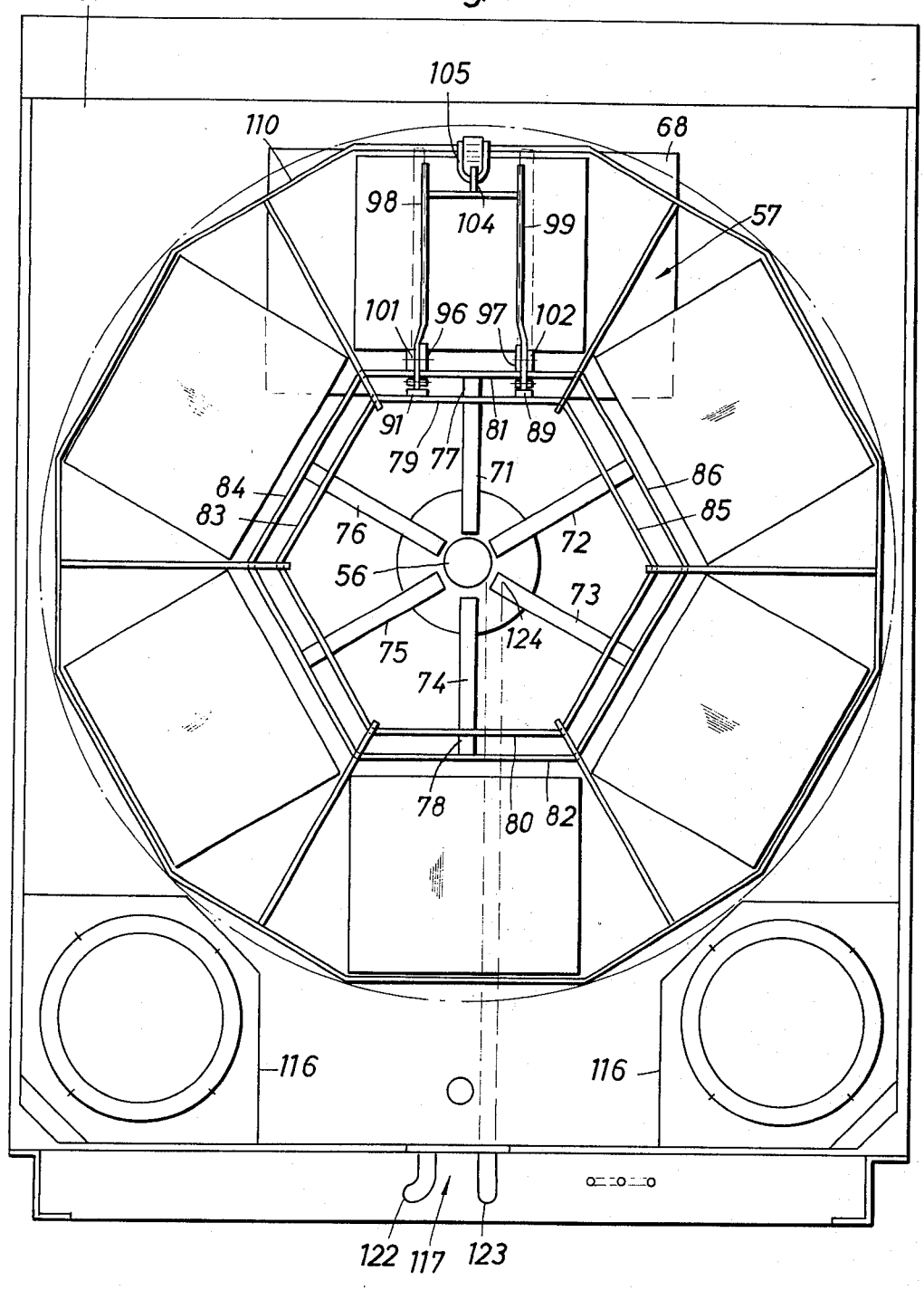
FIG. 2 is an end elevation of FIG. 1 diagrammatically, the carrier being shown behind the front wall, the aperture of which is indicated.
Figure 3:
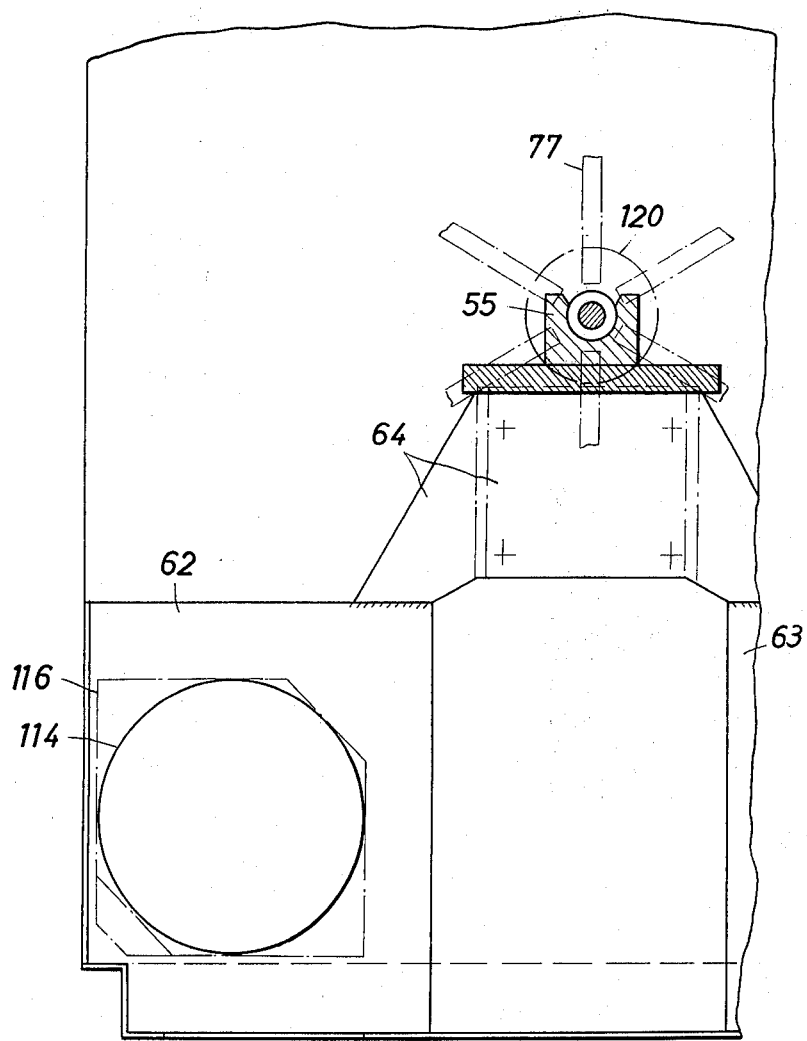
FIG. 3 is a partial elevation corresponding substantially to the line III—III in FIG. 1 to explain a support for the carrier.

Referring to FIG. 2, a supply pipe 122 and a discharge pipe 123 are provided near the fittings 117. Pipe 123 is, for example, extended to the level of the shaft 56 in the region of the boiler back wall 53, where it forms an overflow with aperture 124.

FIG. 1 also shows a spider 125 on shaft 56 outside the boiler 51 to actuate a switch 126 as will be described hereinafter with reference to the circuit diagram shown in FIG. 7.

Figure 7:
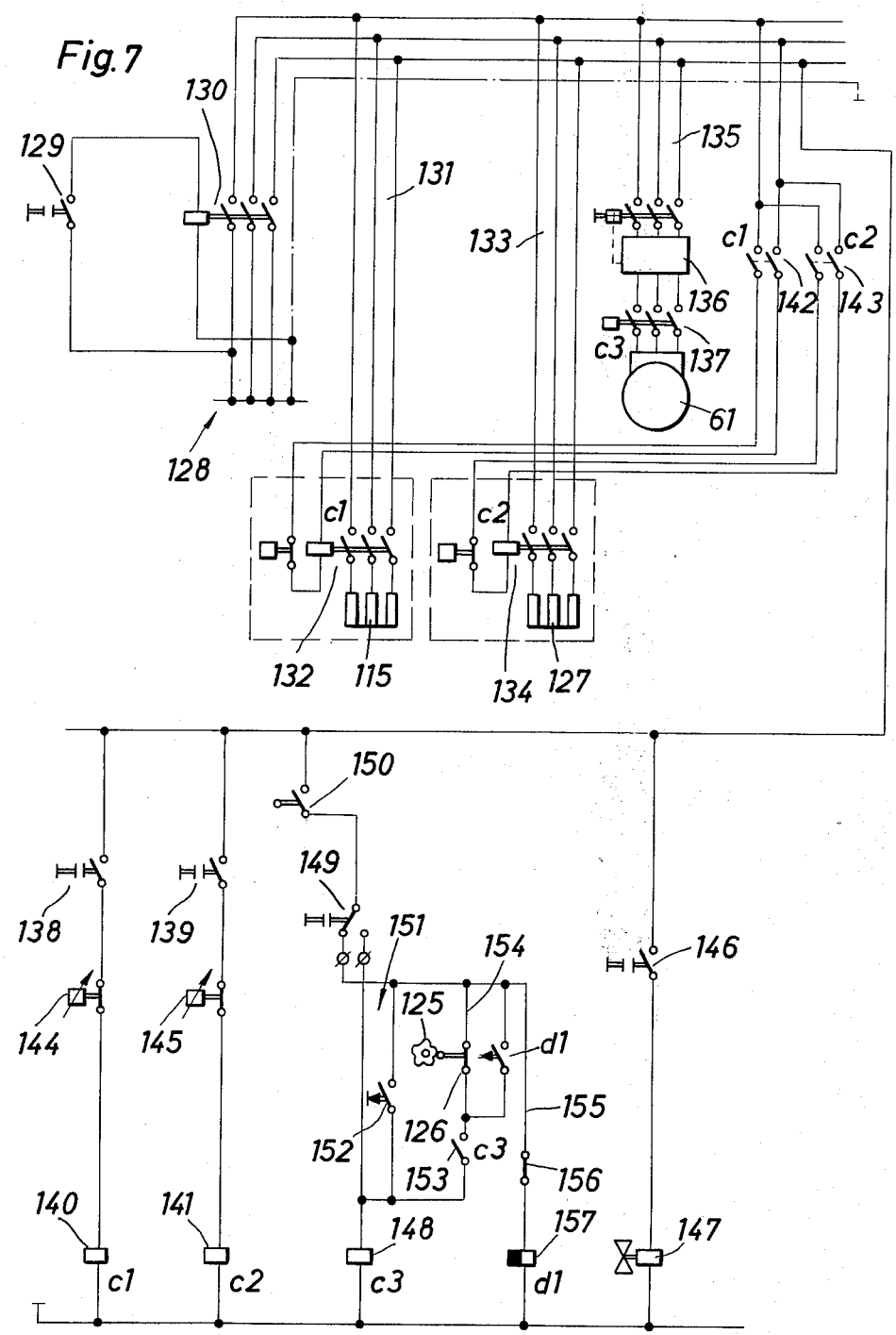
FIG. 7 is a circuit diagram.

FIG. 7 shows two heater elements 115, 127 the first of which also has the same reference in FIG. 1. The geared motor 61 is also shown in FIG. 7, from which fuse means, optical indicators showing the state of operation and the like have been omitted.

The power supply having the general reference 128 is switched on by a main switch 129 and a main contactor 130. A branch 131 containing a contactor 132 leads from the power supply to the heater element 115 while another branch 133 containing contactor 134 leads to element 127. Motor 61 is connected via a branch 135, a motor protective switch 136 and a contactor 137.

The function of the circuit will now be described. When the power supply 128 has been connected, switches 138 and/or 139 can be closed so that the contacts 142, 143 for the contactors 132, 134 are closed via the magnets 140 and/or 141. The supply leads to the magnets 140, 141 may contain adjustable thermostats 144, 145 to enable a specific heating to be set.

The switches 138, 139 are actuated after the tank 51 has been filled to the predetermined level, i.e. approximately the level of the shaft 56. This can be done by actuating the switch 146 which is in series with the drive means 147 for the valve system 118.

The contactor 137 for the motor 61 is actuated by magnet 148 which is operable by the switch 149, the supply lead to which contains a switch 150 as a limit switch for the flap cover 69. The motor can therefore be switched only if the cover is closed.

In the off position, the switch 149 closes a branch 151 via which press-buttons enable the basket carrier 57 to be indexed to an extent such that on each stoppage a receptacle for cans comes into position behind the cover 69. To this end, a press-button switch 152 is provided which is closed temporarily to operate the magnet 148. This magnet then holds via a make contact 153 provided thereon in a loop 154. This loop contains the switch 126 shown in FIG. 1, which is actuated by the spider 125 and thus opens whenever a receptacle with cans comes into position behind the cover 69, so that the excitation of magnet 148 is switched off and the basket carrier stops.

A delayed-disconnection relay 157 is connected via another loop 155 and an off contact 156 of magnet 148 and as a make contact 158 in a loop connected in parallel to switch 126. The purpose of this is that when the basket 57 is advanced another step after stoppage, a current path bridging the switch 126 is available so that magnet 148 will respond and hold via its make contact 153 after a certain rotation after which switch 126 is released by spider 125. When magnet 148 is switched on, excitation of relay 147 is broken by opening of off contact 156.

What is claimed is:
1. Apparatus for heating food products or the like contained in cans comprising: a boiler defined by a plurality of walls; a fluid heating medium supplied to within said boiler in an amount to at least partially fill said boiler to an upper fluid level; a heating system to bring said fluid heating medium within said boiler to a predetermined temperature; a carrier assembly including retainer means for holding at least one can containing said food products; bearing means for rotatably supporting said carrier assembly within said boiler; drive means for rotating said carrier assembly within said boiler through a range of motion wherein said retaining means are sequentially raised and lowered to above and below said upper fluid level within said boiler to alternately submerge and remove said cans from said fluid heating medium; an opening defined in one of said boiler walls above said upper fluid level at a location adjacent the upper range of motion of said retaining means for enabling said cans to be placed in and removed from said retaining means; a detachable cover for said opening; control means for said drive means for controlling movement of said carrier assembly to intermittently stop said carrier assembly with said retaining means aligned with said opening to permit a can to be secured in or removed from said retaining means; said retaining means including can support means pivotally mounted to said carrier assembly and tension lock means releasably engaging said can support means to lock said retaining means to secure a can therein, said can support means being pivoted to provide a downwardly inclined support for said cans when said tension lock means are released from engagement therewith to facilitate removal of said cans from said retaining means through said opening.

2. Apparatus according to claim 1, wherein said carrier assembly is designed as a basket-type frame defining an axis of rotation therefor with said retaining means for said cans arranged on the outer circumference thereof, said can support means comprising rails which are arranged to extend generally parallel to said axis of rotation, said rails each having a remote end and a proximate end, said remote end being located further from said opening than said proximate end, said rails each being pivotally mounted at said remote ends thereof.

3. Apparatus according to claim 2, wherein said tension lock means comprise a locking stirrup having a first end and a second end and pivotally mounted at said proximate end of rails at a point on said locking stirrup closer to said first end thereof, a supporting plate on said basket-type frame located to engage said first end of said locking stirrup to guide movement of said first end, and a spring member located to extend from said remote end of said rails, about said cans and into engagement with said second end of said locking stirrup, with means being provided to effect releasable locking engagement between said second end of said locking stirrup and said spring member.

4. Apparatus according to claim 3, wherein said locking stirrup is mounted to be pivotally moved to extend outwardly from said boiler through said opening into a position in general alignment with said rails to form together with said rails a loading and unloading ramp for said cans.

5. Apparatus according to claim 2, further including projecting abutments on said rails located to be engaged by said cans.

6. Apparatus according to claim 2, wherein said retaining means are sized to accommodate in holding engagement upon said rails a plurality of said cans.

7. Apparatus according to claim 2, wherein said control means comprise a push-button switching system for controlling said drive means to index said basket-type frame with an intermittent rotating motion and to stop said frame with said retaining means in alignment with said opening, fixing means disposed behind said opening, and a switching spider mounted for rotation with said basket-type frame and operatively associated with said switching system so that when said system is actuated one of said fixing means is controlled to stop behind said opening.

* * * * *